(12) United States Patent
Sardanopoli et al.

(10) Patent No.: US 6,258,310 B1
(45) Date of Patent: *Jul. 10, 2001

(54) CROSS-LINKING THERMOPLASTIC POLYURETHANE

(75) Inventors: Armando Sardanopoli, Grosse Ile; J. Richard Stonehouse, Berkley, both of MI (US)

(73) Assignee: BASF Corporation, Mt. Olive, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,528

(22) Filed: Mar. 18, 1999

(51) Int. Cl.[7] .................................................... B29C 47/00
(52) U.S. Cl. .................................. 264/211.23; 264/171.1; 264/209.6; 264/211.24; 525/131
(58) Field of Search ............................ 264/211.24, 209.6, 264/211.23, 177.11, 177.14, 171.1; 525/53, 66, 131

(56) References Cited

U.S. PATENT DOCUMENTS

| | | | | |
|---|---|---|---|---|
| 3,963,679 | * | 6/1976 | Ullrich et al. | 264/211 |
| 4,261,946 | * | 4/1981 | Goyert et al. | 264/211 |

* cited by examiner

Primary Examiner—Jan H. Silbaugh
Assistant Examiner—Mark Eashoo
(74) Attorney, Agent, or Firm—Fernando A. Borrego

(57) ABSTRACT

The invention comprises modifying a preformed thermoplastic polyurethane product made from the reaction of a difunctional isocyanate with a polyester or a polyether diol, along with a monomeric, low molecular weight diol as a chain extender. The preformed thermoplastic polyurethane product is then cross-linked by the addition of an isocyanate prepolymer made from the reaction of an excess of a polyisocyanate with a polyester or polyether polyol. The invention further comprises a process for forming the thermoplastic polyurethane product described above utilizing a single or twin screw extruder to mix and react the ingredients.

13 Claims, No Drawings

CROSS-LINKING THERMOPLASTIC POLYURETHANE

BACKGROUND OF THE INVENTION

1. Field of the Invention

The invention relates to a thermoplastic polyurethane product with improved high temperature softening point, hot oil fuel resistance, and improved compression set.

2. Description of the Prior Art

Processes for the continuous production of thermoplastic polyurethanes in double shaft screw extruders with self-cleaning screws by the reaction of relatively high molecular weight polyhydroxyl compounds, polyisocyanates and chain lengthening agents have been disclosed in U.S. Pat. No. 3,963,679. In these processes, the reaction mixture must be mixed vigorously inside the screw extruder with the aid of kneading elements at a stage in which the melt still has a low viscosity (about 20 to 70 Pascals) so as to produce homogeneity in the end product. According to one variation of these processes, aggregates such as thermoplasts may be mixed with the product in the screw extruder during or after the reaction but there is no indication in these publications that the mechanical properties of thermoplasts could be improved.

U.S. Pat. No. 4,261,946, issued to Goyert et al. describes a process for the addition of polyurethane forming components to a molten thermoplastic polymer to form so-called "hard elements" in situ. In this way, Goyert is able to form very rigid and highly elastic materials from inexpensive thermoplastic materials that would otherwise have only moderate hardness and strength. The Goyert reference does not disclose a method for producing a thermoplastic polyurethane material having a high temperature softening point, resistance to thermal attack and similar characteristics which would be useful in numerous applications such as tubes, hoses, cable jacketing, film, sheet or any other extrusion profile form.

SUMMARY OF THE INVENTION

The invention comprises modifying a preformed thermoplastic polyurethane product made from the reaction of a difunctional isocyanate with a polyester or a polyether diol, along with a monomeric, low molecular weight diol as a chain extender. The preformed thermoplastic polyurethane product is then cross-linked by the addition of an isocyanate prepolymer made from the reaction of an excess of a polyisocyanate with a polyester or polyether polyol.

The invention further comprises a process for forming the thermoplastic polyurethane product described above utilizing a single or twin-screw extruder to mix and react the ingredients.

DETAILED DESCRIPTION OF THE PREFERRED EMBODIMENTS

The process of the invention comprises mixing, reacting and forming the finished product, which can be in the form of a tube, hose jacketing, cable jacketing, film, sheet or any other extrusion profile form in one step. Advantageously, the finished product provides improved thermal resistance. Further, the cross-linking that occurs during the extrusion process and forming the finished product is done in one step.

The invention relates to the modification of a preformed thermoplastic polyurethane comprising first introducing a preformed thermoplastic polyurethane into an extruder, preferably a multishaft extruder, most preferably a double shaft screw extruder with self-cleaning screws, at a first inlet, wherein the temperature in the extruder is such that said thermoplastic polyurethane melts. The second step comprises adding to said molten thermoplastic polyurethane through a second inlet, and optionally other inlets, a cross-linking composition comprised of an isocyanate prepolymer.

The isocyanate prepolymer is made from the reaction of an excess of a polyisocyanate with a polyester, a polyether polyol or combinations of the two. Once the thermoplastic polyurethane and the isocyanate prepolymer have reacted, the finished thermoplastic polyurethane product is discharged from the extruder.

Preferably, the isocyanate prepolymer is added in an amount of from about 0.5 to about 15.0% by weight of the preformed thermoplastic polyurethane.

Preferably, the isocyanate prepolymer of the invention comprises a prepolymer having free NCO in the range of from about 10 to about 30% by weight of the prepolymer, more preferably from about 15 to about 25% by weight of the prepolymer. NCO levels above the top of this range tend to also have high functionalities and result in prepolymers with poor flow characteristics. Similarly, NCO levels below the bottom of the range tend to bunch up and flow poorly.

The previously prepared thermoplastic polyurethanes that may be used according to the invention include in particular the known thermoplastic polyurethanes that may be obtained, for example, in accordance with U.S. Pat. No. 3,963,679 and U.S. Pat. No. 4,035,213, the disclosures of which are incorporated herein by reference, using the starting materials described therein.

The polyester polyols used in forming the isocyanate prepolymer advantageously have an average functionality of from about 2.0 to about 3.0. Their average hydroxyl number values generally fall within a range of from about 56 up to about 1200.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di-esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Further, preferred polyester polyols, including polyester polyols of lactones, e.g., ε-caprolactone or hydroxycarboxylic acids, e.g., (ω-hydroxycaproic acid, may be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation. Preferred chain extenders for use in producing the polyester polyols include butanediol, hexanediol and ethylene glycol.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

Suitable polyoxyalkylene polyether polyols for use in forming the isocyanate prepolymer of the invention can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed in *Encyclopedia of Chemical Technology*, Vol. 7, pp. 257–262, published by Interscience Publishers, Inc. (1951), the disclosure of which is incorporated herein by reference.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis (4-hydroxyphenyl)-propane, commonly known as Bisphenol A.

In addition to the above-described polyols, one or more additional polyols may be reacted with the isocyanate component of the isocyanate prepolymer, including castor oil, glycerol or trimethanol propane (TMP).

The compounds used as isocyanate components for the isocyanate prepolymer of the process according to the invention may include all essentially known aromatic multivalent isocyanates. Preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 10 to 30 weight percent, preferably 15 to 25 weight percent, based on the total weight, e.g., with low molecular weight diols, triols, dialkylene glycols, trialkylene glycols, or polyoxyalkylene glycols with a molecular weight of up to 1500;modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Furthermore, liquid polyisocyanates containing carbodiimide groups having an NCO content of 10 to 30 weight percent, preferably 15 to 25 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene dilsocyanate.

Preferably, the isocyanate component used to react with the polyol composition of the isocyanate prepolymer will have a functionality of from about 2.0 to about 3.0.

Catalysts may be employed which greatly accelerate the reaction of the polyol component with the polyisocyanate component of the isocyanate prepolymer. Examples of suitable compounds are organometallic and metallocene catalysts. Preferably, the organometallic catalysts include organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1-8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1-8C) tin (TV) salts of inorganic compounds such as butyltin trichloride, dimethyl- and diethyl- and dibutyl- and dioctyl- and diphenyl-tin oxide, dibutyltin dibutoxide, di(2-ethylhexyl) tin oxide, dibutyltin dichloride, and dioctyltin dioxide. Preferred, however, are tin catalysts with tin-sulfur bonds that are resistant to hydrolysis, such as dialkyl (1-20C) tin dimercaptides, including dimethyl-, dibutyl-, and dioctyl- tin dimercaptides.

The catalyst system may alternatively include a metallocene compound of the general formula

RLM(D)

wherein M is a transition metal of group III B, IV B, V B, VI B of the periodic table, wherein R is a ligand having a conjugated electron bonded to M of which there may be one, two or three such ligand which may be same of different;

wherein L is a leaving group preferably anionic bonded to M of which there may be one, two, three or four depending on the valency of M and the member of other substituents on M; and D is an optional electrondonating hetero atom group.

R may be or include a substituted or unsubstituted cycloalkadienyl group such as cyclopentadiene, indenyl, tetrahydro-indenyl or fluorenyl. Where more than one such cycloalkadienyl group is present, the groups may be bridged. Where only one cycloalkadienyl group is present such group may be bridged to other transition metal ligands such as D.

L may be or include an aryl group, alkyl group, an aralkyl group, an alicyclic group, a halogen atom, a hetero atom containing ligand containing an oxygen sulfur, nitrogen or phosphorus atom; these groups may be connected by single or multiple bonds to M.

Optionally, the preformed thermoplastic polyurethane of the invention may include one or more filler compositions, which may be added according to the final product characteristics desired by the end user. Examples of suitable flame retardants which may be included as part of the preformed thermoplastic polyurethane are tetrakis(2-chloroethyl) ethylene phosphonate, tris(1,3-dichloropropyl) phosphate, tris (beta-chloroethyl) phosphate, tricresyl phosphate, tris(2,3-dibromopropyl)phosphate, tris(beta-chloropropyl) phosphate, tricresyl phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters. In general, from 2 to 50 parts by weight, preferably from 5 to 25 parts by weight, of said flameproofing agents may be used per 100 parts by weight of the polyols.

Other optional fillers may include conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

As described above, the apparatus used for the process according to the invention are preferably those having a single screw, twin screw, multishaft or a modified screw configuration, preferably those having a co-rotating and self-cleaning design. Commercially available and suitable apparatus include a Wemer-Pfleiderer co-rotating intermeshing twin screw model, and a Welding Engineers unit with a counter-rotating, non-intermeshing, twin screw design from Welding Engineers, Inc., Blue Bell, Pa., U.S.A. Single screw extruders are available from Bersdorff in Charlotte, N.C., U.S.A. Suitable results can also be achieved with a Buss Kneader available from Buss America, Elk Grove, Ill., U.S.A.

The dwell times of the molten reaction mixture in the screw extruder are generally in the range of from 0.3 to 30 minutes, preferably from 0.5 to 4 minutes. The temperature of the screw housing is in the range of about 60 deg. to 300 deg. C. (about 80 deg. to 280 deg. C. in the intake zone; about 100 deg. to 300 deg. C. in the middle of the extruder and about 60 deg. to 250 deg. C. in the discharge zone). The melt leaving the extruder is chilled and broken down into small pieces by known methods. The products of the process may be worked up thermoplastically or in solution in the usual manner to form tubes, hoses, cable jacketing, film, sheet or any other extrusion profile form.

EXAMPLE 1

Preformed thermoplastic polyurethanes were modified using various polyisocyanate prepolymer compounds. In the following Table, Polymer A comprises a preformed thermoplastic polyurethane combined with unrefined methylene diisocyanate (MDI). Polymer B is a preformed thermoplastic polyurethane combined with an isocyanate prepolymer formed from MDI, dipropylene glycol, and ethylene oxide. Polymer C is a preformed thermoplastic polyurethane combined with a polytetrahydrofuran polyol. Finally, Polymer D is a preformed thermoplastic polyurethane combined with the prepolymer of Polymer B, except that the prepolymer has, in addition to the listed polyols, castor oil as an additional cross-linking agent. As can be seen, Polymers B, C and D formed by the claimed process have a free isocyanate content of between 20 and 30% by weight of the prepolymer. Polymer A, which had a free NCO% of 33% and a functionality of 3.0 had poor flow and was not usable in the extruder.

| POLYMER | FREE NCO % | FUNCTIONALITY | CHARACTERISTICS |
| --- | --- | --- | --- |
| A | 33 | 3.0 | SANDY APPEARANCE; POOR FLOW |
| B | 23 | 2.1 | GOOD FLOW |
| C | 13 | 2.0 | GOOD FLOW |
| D | 20 | 2.0 | GOOD FLOW; HIGH STABILITY |

What is claimed is:

1. A method for forming a modified thermoplastic polyurethane comprising the steps of:
   a) forming an isocyanate-terminated prepolymer having from 10 to 30% by weight based on the weight of the prepolymer free NCO by reacting a polyisocyanate with at least one polyester polyol, or at least one polyether polyol, or a mixture thereof; the polyisocyanate present in a stoichiometric excess amount to form the prepolymer containing free NCO;
   b) introducing a preformed thermoplastic polyurethane into a first inlet of an extruder, the extruder at a temperature above the melting point of the preformed thermoplastic polyurethane;
   c) introducing from 0.5 to 15% by weight, based on the total weight of the preformed thermoplastic polyurethane, of the isocyanate-terminated prepolymer having free NCO formed in step a) into a second inlet of the extruder and mixing the isocyanate-terminated prepolymer containing free NCO with the preformed thermoplastic polyurethane;
   d) reacting the isocyanate-terminated prepolymer containing free NCO with the thermoplastic polyurethane, thereby forming a crosslinked thermoplastic polyurethane; and
   e) discharging the crosslinked thermoplastic polyurethane from the extruder.

2. A method as recited in claim 1 wherein step a) further comprises forming the isocyanate-terminated prepolymer by reacting at least one diphenylmethane diisocyanate with dipropylene glycol and ethylene oxide.

3. A method as recited in claim 1 wherein step a) further comprises forming the isocyanate-terminated prepolymer by reacting a polyisocyanate with at least one polyester polyol, or at least one polyether polyol, or a mixture thereof, and at least one polyol selected from the group consisting essentially of castor oil, glycerol, or trimethanol propane; the polyisocyanate present in a stoichiometric excess amount to form the prepolymer containing from 10 to 30% by weight based on the weight of the prepolymer free NCO in an amount of.

4. A method as recited in claim 1 wherein step a) further comprises forming the isocyanate-terminated prepolymer by reacting a polyisocyanate with at least one polyester polyol having a functionality of from 2 to 3 and an average hydroxyl number of from 56 to 1200; the polyisocyanate present in a stoichiometric excess amount to form the prepolymer containing from 10 to 30% by weight based on the weight of the prenolymer free NCO.

5. A method as recited in claim 1 wherein step b) further comprises maintaining the extruder at a temperature of from 60° to 300° C.

6. A method as recited in claim 1 wherein steps c) and d) further comprise mixing and reacting the isocyanate-terminated prepolymer containing free NCO with the thermoplastic polyurethane for from 0.3 to 30 minutes.

7. A method as recited in claim 1 wherein step b) further comprises introducing the preformed thermoplastic polyurethane into a first inlet of a multi-shaft extruder.

8. A method as recited in claim 7 wherein step b) further comprises introducing the preformed thermoplastic polyurethane into a first inlet of a double shaft screw extruder having self-cleaning screws.

9. A method as recited in claim 1 comprising the further step of forming the crosslinked thermoplastic polyurethane into an article selected from the group consisting of tubes, hose jackets, cable jackets, film, or sheets.

10. A method as recited in claim 1 wherein step b) further comprises introducing a preformed thermoplastic polyurethane having a filler selected from the group consisting of flame retardants, organic fillers, inorganic fillers, reinforcing agents, or combinations thereof into a first inlet of an extruder, the extruder at a temperature above the melting point of the preformed thermoplastic polyurethane.

11. A method as recited in claim 10 further comprising selecting a flame retardant from the group consisting of tetrakis (2-chloroethyl) ethylene phosphonate, tris(1,3-dichloropropyl) phosphate, tris(beta-chloroethyl) phosphate, tricresyl phosphate, tris(2,3-dibromopropyl)phosphate, tris(beta-chloropropyl)phosphate, tricresyl phosphate, red phosphorus, aluminum oxide hydrate, antimony trioxide, arsenic oxide, ammonium polyphosphate and calcium sulfate, expandable graphite, melamine, and mixtures thereof.

12. A method as recited in claim 10 further comprising selecting an organic filler from the group consisting of antigorite, serpentine, hornblends, amphiboles, chrysotile, talc, kaolin, aluminum oxides, titanium oxides, iron oxides, chalk, barytes, cadmium sulfide, zinc sulfide, aluminum silicate, coprecipitates of barium sulfate and aluminum silicate, wollastonite, metal, glass fibers, and mixtures thereof.

13. A method as recited in claim 10 further comprising selecting an organic filler from the group consisting of carbon black, melamine, colophony, cyclopentadienyl resins, cellulose fibers, polyamide fibers, polyacrylonitrile fibers, polyurethane fibers and polyester fibers, or mixtures thereof.

* * * * *